United States Patent [19]

Johnson

[11] Patent Number: 5,713,202

[45] Date of Patent: Feb. 3, 1998

[54] METHODS FOR PRODUCING HYDRO-ELECTRIC POWER

[75] Inventor: Arthur F. Johnson, Boulder, Colo.

[73] Assignee: Energy Conservation Partnership, Ltd., Boulder, Colo.

[21] Appl. No.: 697,223

[22] Filed: Aug. 21, 1996

Related U.S. Application Data

[60] Continuation-in-part of Ser. No. 470,093, Jun. 6, 1995, Pat. No. 5,551,237, which is a division of Ser. No. 222,753, Apr. 4, 1994, Pat. No. 5,461,858.

[51] Int. Cl.$^6$ .............................. F16D 31/00; F04B 17/00
[52] U.S. Cl. ...................... 60/325; 60/398; 417/381
[58] Field of Search ............... 60/325, 398; 417/379, 417/381

[56] References Cited

U.S. PATENT DOCUMENTS

| | | | |
|---|---|---|---|
| 120,545 | 10/1871 | Stevens . | |
| 995,219 | 6/1911 | Bradley . | |
| 1,055,880 | 3/1913 | Coster . | |
| 1,275,503 | 8/1918 | Turner . | |
| 1,290,756 | 1/1919 | Kasley . | |
| 1,356,463 | 10/1920 | Okun . | |
| 3,611,723 | 10/1971 | Theis, Jr. . | |
| 3,624,700 | 11/1971 | Schaeve | 91/461 |
| 3,688,502 | 9/1972 | Hansen | 60/56 |
| 3,839,863 | 10/1974 | Frazier | 60/327 |
| 3,991,574 | 11/1976 | Frazier | 60/645 |
| 3,995,428 | 12/1976 | Roberts | 60/64 |
| 4,052,858 | 10/1977 | Jeppson | 60/648 |
| 4,095,423 | 6/1978 | Gorlov | 60/398 |
| 4,103,490 | 8/1978 | Gorlov | 60/398 |
| 4,201,049 | 5/1980 | Tobber | 60/325 |
| 4,464,080 | 8/1984 | Gorlov | 405/76 |
| 4,514,979 | 5/1985 | Mohr | 60/512 |
| 4,685,510 | 8/1987 | Priem et al. | 417/381 X |
| 5,074,710 | 12/1991 | Gorlov | 405/76 |
| 5,222,833 | 6/1993 | Gorlov | 405/76 |
| 5,419,135 | 5/1995 | Wiggs . | |
| 5,461,858 | 10/1995 | Johnson | 60/325 |
| 5,551,237 | 9/1996 | Johnson | 60/325 |

FOREIGN PATENT DOCUMENTS

| | | | |
|---|---|---|---|
| 2139932 | 2/1973 | Germany | 417/381 |

OTHER PUBLICATIONS

Hydraulic Turbines, pp. 25–31 (No Date).
Technology Review, "Hydropower That's Clean and Green", pp. 13 and 14 (No Date).

*Primary Examiner*—Hoang Nguyen
*Attorney, Agent, or Firm*—Pennie & Edmonds LLP

[57] ABSTRACT

A process of utilizing combustion products from fossil fuels to produce hydro-electric power through a process of allowing such products to displace water from a tank for operating a turbine or pelton wheel. The process allows hydro-electric power to be generated at a greatly increased efficiency. Preferably, two tanks are used to receive combustion products which exert pressure to displace the water. Alternatively, oxygen or air and a fossil fuel such as natural gas are introduced into the tank and combusted therein to generate the combustion products. The process allows existing power plants to generate additional power, and thus greatly increase the overall efficiency of the plant.

20 Claims, 3 Drawing Sheets

METHODS FOR PRODUCING HYDRO-ELECTRIC POWER

CROSS-REFERENCE TO RELATED APPLICATIONS

This application is a continuation-in-part of application Ser. No. 08/470,093 filed Jun. 6, 1995, now U.S. Pat. No. 5,551,237, which is a division of application Ser. No. 08/222,753 filed Apr. 4, 1994 now U.S. Pat. No. 5,461,858.

TECHNICAL FIELD

The present invention relates to the production of hydro-electric power. More particularly, the present invention relates to the production of hydro-electric power through the combustion of fossil fuels such as natural gas and the use of the combustion products to displace water.

BACKGROUND OF THE INVENTION

In order to produce electricity on a commercial scale, it is generally accepted that a rotating motor generator is necessary to rotate magnets around coils of wire. A generator is commonly rotated through impinging a gas such as steam against a wheel. A steam generator of this conventional type will only have an efficiency of 35 or perhaps 40 percent. Thus the steam driven electric generators result in a substantial waste of fossil fuels. No system has been developed to correct this enormous inefficiency and waste of fossil fuel resources which, of course, cannot be replaced.

Many patents have been directed to produce power from steam or gas more efficiently, but all have lacked the simplicity of both design and construction to be adapted for safe use in modern power plants.

My earlier U.S. patents, namely Nos. 5,461,858 and 5,551,237, disclose that steam or water-vapor can be used displace water in a series of tanks for use in rotating a turbine wheel to generate electricity. The present invention is an improvement and simplification of my earlier patents.

SUMMARY OF THE INVENTION

The present invention overcomes the problems in the prior art through a unique process that allows the production of hydro-electric power at greatly increased efficiency than was previously possible. The object of the present invention is to produce hydro-electric power from the use of combustion products of hydrocarbon fuels through a method that can be adapted to existing power plants.

This object is achieved by burning a fossil fuel to generate combustion products; introducing the combustion products into a first tank which is full of water to displace the water and cause it to exit the tank; and directing the exiting water to a hydro-electric apparatus for operation of the same to generate power. The tank may include a movable plate therein which displaces the water when the combustion products are introduced into the tank.

The water exits the tank through an aperture which has a relatively small area compared to the cross-sectional area of the tank. Specifically, the area of the tank should be between 20 and 50 times the area of the aperture for optimum performance. Also, the exiting water may be directed to a reservoir prior to directing the water to the hydro-electric apparatus. A preferred hydro-electric apparatus comprises a Pelton wheel which is rotated to generate electricity. If desired, the hydro-electric apparatus can produce direct current for charging one or more batteries.

If desired, a second tank can be used in the same manner as the first tank so that one tank can be refilled with water while the other is releasing water. Each tank may include a movable plate therein for displacing the water. One tank may be smaller than the other tank so that it can be advantageously placed inside of the other tank to reduce operating costs. The water which exits the hydro-electric apparatus can be recycled back to one of the tanks. When two tanks are used, the recycled water, can be directed back to one of the tanks while the other is receiving combustion products and displacing water for the most efficient operation of the process.

The water in the tank or tanks can be treated to facilitate operation of the process. For example, the recycled water can be heated before being directed back to the tanks. Also, alkaline material can be added to the water to offset acidic components from the combustion products and reduce corrosion of the hydro-electric apparatus.

The fossil fuel to be combusted can include any source of hydrocarbon materials, such as coal, oil or natural gas with the latter being preferred.

Another process for generating hydro-electric power according to the invention includes the steps of introducing a mixture of oxygen and a fossil fuel into a first tank which is substantially full of water; combusting the mixture to form combustion products which displace the water and cause it to exit the tank; and directing the exiting water to a hydro-electric apparatus for operation of the same to generate power.

The fuel should be used in the gaseous state, with natural gas being preferred. A convenient source of oxygen is air, and copper or brass screens can be utilized to prevent burning of the fuel and air before the mixture enters the tank. Advantageously, the fuel, air or fuel/air mixture can be heated before entering the tank to facilitate combustion thereof. Thus, the tank should be insulated to retain heat therein for warming one or more of the fuel, air, fuel/air mixture or water therein.

The water in the tank is generally heated by combustion of the fuel/oxygen mixture to reduce its viscosity and increase the efficiency of operation of the hydro-electric apparatus. The efficiency of water impingement in the hydro-electric generator of the present invention is on the order of 70 to 90 percent, as opposed to only 35 or 40 percent that is achieved with utilizing steam impingement.

DETAILED DESCRIPTION OF THE PREFERRED EMBODIMENT

Figure 1:
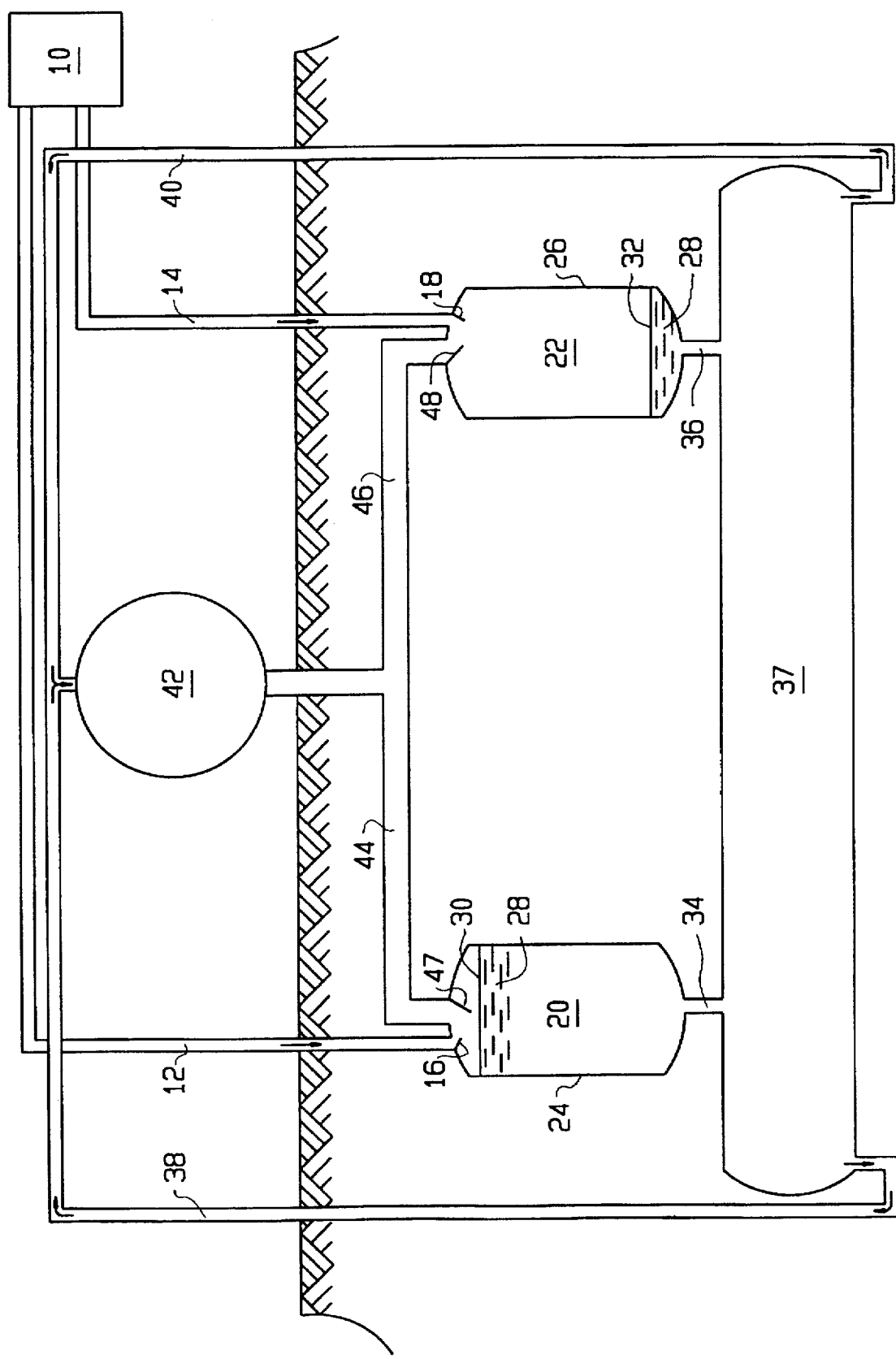
FIG. 1 is a cross-sectional view of the preferred embodiment of the present invention.

One embodiment of the invention is shown in FIG. 1, wherein there is an existing power plant 10, with pipes 12, 14, leading combustion products away from the power plant 10. The pipes are provided with valves 16, 18 at the entrance of the pipes 12, 14 to the cylindrical chambers 20, 22, which are enclosed by reinforced concrete 24, 26. Light weight vermiculite concrete is advantageously used, as it retains little heat.

The power plant can generate combustion products from any suitable fossil fuel which is made of hydrocarbon material, including coal, oil and/or natural gas. Fossil fuel is also defined in this application as including waste products of organic materials which can be burned to produce heat and combustion products. The term "combustion products" is used to include carbon oxides, such as carbon dioxide and carbon monoxide, steam or water vapor, and other gases. Nitrogen as well as nitrogen oxides are usually present and are included in the definition of this term.

An important feature of the invention is that when a hydrocarbon fuel, such as, e.g., methane, is burned in air, the following general reaction takes place $$CH_4 + 2O_2 + N_2 \rightarrow CO_2 + 2H_2O + N_2$$

Water is generally present as steam, and small amounts of $CO$, $NO_2$ and $NO_4$ are produced. The burning of a unit volume of the fuel produces a much larger volume of combustion products. Thus, in an alternate embodiment of the invention, a gaseous fossil fuel such as natural gas can be introduced into the top of the tank with air or oxygen and then combusted to form the relatively larger volume of combustion products. This volume of combustion products produces pressure on the water to force it out of the tank. A small space at the top of the tank is suitable to retain gas and air for combustion.

A spark plug, piezoelectric ignition or other ignition source can be used to combust the fuel and air mixture. This can be performed in a manner similar to that of an automobile internal combustion engine. When two tanks are used, the combustion of the mixture in one tank can force the water out into a second tank, while subsequently, the mixture in the second tank can be combusted to force the water back to the first tank. Of course, the hydro-electric device would be operatively associated with the tanks. For convenience, the device may be placed between the tanks.

The combustion of a fuel will generate heat in the tank. This heat will generally raise the temperature of the water before it exits the tank. This is advantageous because the viscosity of water is reduced at higher temperatures. For example, at 50° F., the viscosity of water is 1.308, at 68.4° F., it is 1.0, at 100° F. it is 0.679 and at 150° F., it is 0.432. Such reduced viscosity water increases the efficiency of the operation of a hydro-electric device such as a Pelton wheel. To retain heat within the tanks for transfer to the water, the tanks can be insulated.

Inside the chambers 20, 22, there is water 28, and lightweight floats 30, 32 preferably made of fiberglass reinforced plastic. The floats 30, 32 can be used to keep the combustion products from blowing directly onto the water 28. However, the process is operable even without the use of such floats. Alkaline material, such as sodium hydroxide or sodium carbonate, can be added to the water to render it slightly alkaline (i.e., a pH of about 7.5 to 9). This counteracts the effects of acidic components in the combustion products which may dissolve in the water and thus reduces corrosion of metallic equipment parts.

As shown in FIG. 1, the case of floats 30, 32 is preferred. When float 30 is near the bottom of its stroke, float 32 will be near the top of its stroke so that a high pressure stream of water will flow through ducts 34, 36. Preferably a reinforced high pressure water storage tank 37 is provided. From the tank 37, the water flows through pipes 38, 40. The stream of water will act upon a pelton wheel 42 or any acceptable turbine. The pelton wheel 42 is preferably provided with a rotor and buckets. The stream of water rotates electric generators, and once spent flows down ducts 44, 46 back into chambers 20, 22, through valves 47, 48.

It is also incorporated into this disclosure that the tanks can be of any size, shape, or cross section. While cylindrical tanks would be the most efficient, rectangular, square or even round tanks can be used.

Figure 2:
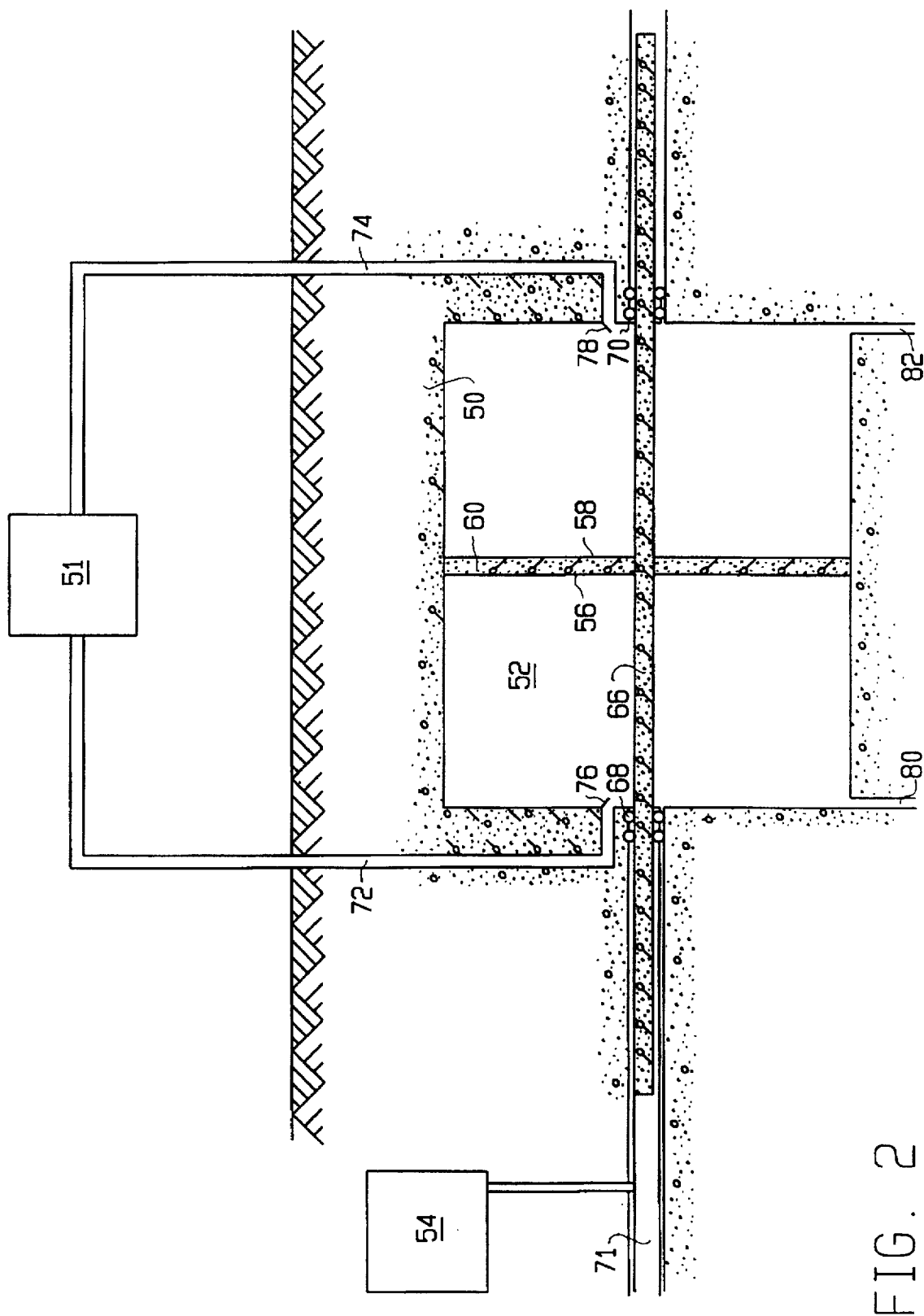
FIG. 2 is a cross-sectional view of an alternative embodiment of the present invention.

In an alternative embodiment of the invention, as shown in FIG. 2, another structure is provided. A reinforced concrete tank 50 is provided under the earth surface, located near an existing power plant 51. Subsurface construction allows mechanical reinforcing of tamped earth around the pipes and heat savings since earth, when kept dry is a good heat insulating material. There is a cylindrical space 52 where the combustion products enter to pump water to the hydro-electric generator 54.

A reinforced concrete tank of, for example, 10 feet in diameter can withstand the operational pressures. There are two circular plates 56, 58, which can be made of stainless steel, which retain a light weight heat resistant concrete plate 60, which can be provided with grooves that can be filled with heat resistant packing such as Teflon or graphitized asbestos.

There is further provided a stainless steel shaft 66, to which the plates 56, 58 are securely attached by welding or the like. Large roller bearings 68, 70 are provided to support the piston rod and assembly. Water 71 will be pumped with a pressure equal to the face area of the piston divided by the area of the shaft end area. Therefore, if the piston face is 100 feet * pi (3.14)=314 square feet, and the piston rod is 0.25 feet * pi (3.14) or 0.74 square feet, the ratio is about 400 to 1. In operation, combustion products exerting a pressure of 15 psia exerts a pressure of the water of 6,000 psia, which would lift water to a height of (6,000* 14.7/32)=2,756 feet, suitable for a hydro-electric plant that uses impulse wheels to obtain 85 percent efficiency. Stainless steel ducts 72, 74 are also provided for the introduction of steam via the steam valves 76, 78 alternately into first one side of the piston and then the other. Ducts 80, 82 are also provided for draining condensation of steam or other hot vapors. Stainless steel equipment may be used to resist corrosion due to the acidic components of the combustion products.

By this simple means and relatively inexpensive apparatus compared to conventional steam turbines now used in electric power plants it is made possible doubling the capacity for producing electricity without an increase in the amount of fossil fuel in the power plant.

The capital cost of the apparatus used is insignificant compared to the cost of steam turbines. The existing walls of high pressure steam tubing now in power plants will have much greater capacity to recover heat when more water at lower pressures is forced through the tubes.

Figure 3:
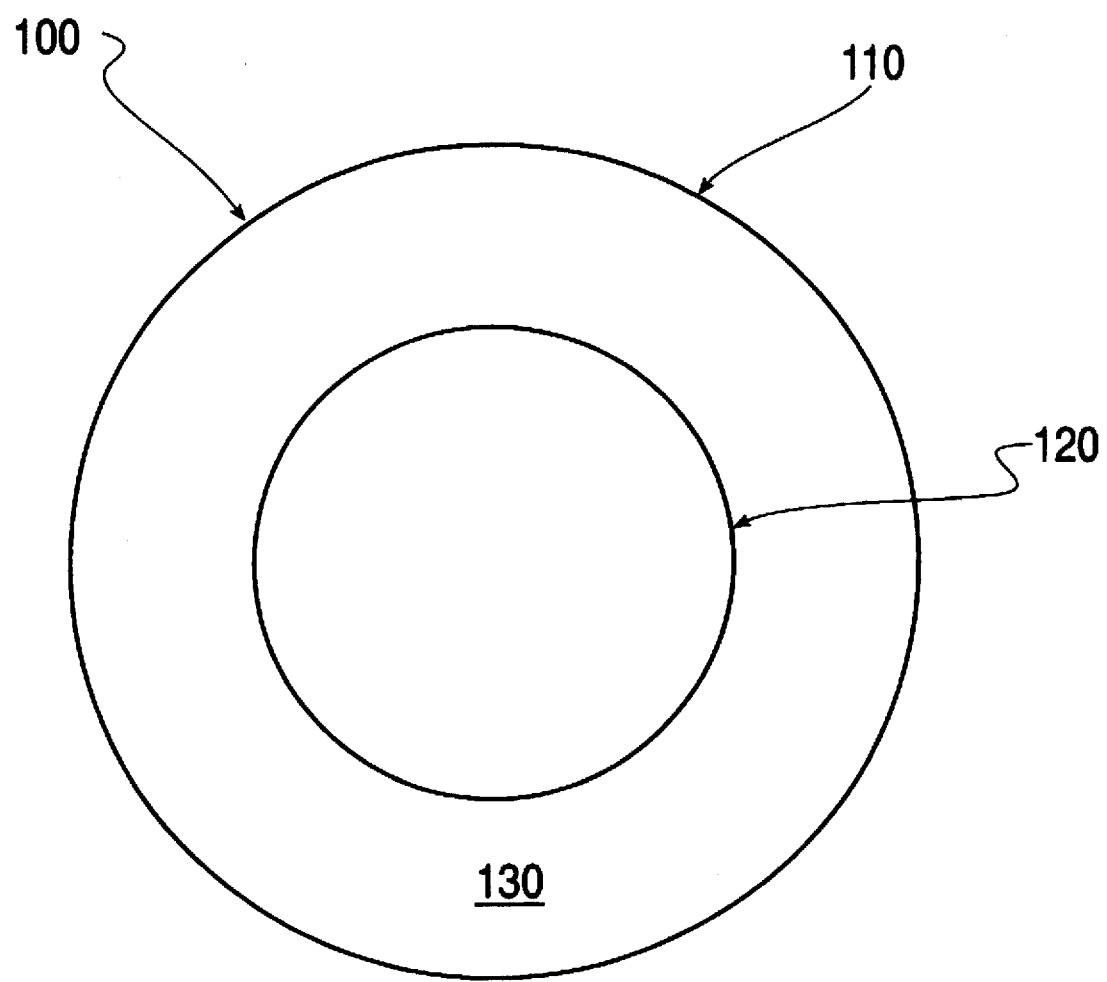
FIG. 3 is a cross-sectional plan view of yet another embodiment of the invention.

In a further modification of the invention, as shown in FIG. 3, both capital and operating costs can be lowered by placing one tank inside of the other. The apparatus 100 includes an outer cylindrical tank 110 of, e.g. 50' diameter and an inner cylindrical tank 120 of, e.g. 35' diameter. The tops of these tanks are designed to allow combustion products (or fuel/air mixtures that are to be combusted) to enter either the top of the inner tank 120, or the ring like space 130 between the inner tank 120 and the outer tank 110. In this manner, the inner tank 120 can be substantially full of water when the combustion products exert pressure to cause the water to exit. At the same time, the space 130 can be filled with water. Therefore, the combustion products can exert a force at the top of space 130, while the inner tank 120 is being filled. For a 50' tall vessel, the relative volumes would be about the same, i.e., about 48,000 cubic feet for the inner vessel and about 50,000 cubic feet for space 130.

EXAMPLES

The following are exemplary illustrations of the processes of the present invention.

Example 1

Comparison of ideal and actual cycles for regenerative feedwater heating.

TABLE I

| Psia | lbs/hour | lbs/minute | temp (°F.) | lbs/in² absolute (PSA) |
|---|---|---|---|---|
| 510 | 75,876 | 1,265 | 458.7 | 510 |
| 148.6 | 46,862 | 781 | 369.5 | 486 |
| 34.8 | 29,525 | 492 | 275.0 | 34.8 |
| 5.5 | 31,483 | 525 | 177.6 | 5.47 |
| 1.0 | 378,312 | 6,305 | 79.1 | 1" Hg |

(Data taken from Mark's Standard Handbook for Mechanical Engineers, Baumeister Avallone Baumeister Eighth Edition, McGRAW-HILL BOOK COMPANY, 1951)

An examination of the above information shows that it is not attractive to direct 510 psia 458.7° F. steam into an apparatus to recover the energy in a hydraulic turbine rather than an existing steam turbine because high temperature places expansion and physical decomposition forces on the packing glands of the pumps despite that teflon packing glands can withstand 370° F.

The 148.6 psia 781 lbs/min 369.5° F. and 486 Psa steam might be continuous fed into first one end and then the other end of a reciprocating steam pump and would have a weight of 1/0.130 or 7 cu ft/lb.

In this Example, the design of the invention would include a reinforced concrete tube having a 20 ft inside diameter (10 ft in radius) in which a steel pipe is placed. This pipe has an outer diameter of 1 ft., a length of 85 ft, and is supported via long roller bearings at each end. A piston is used which is slightly less than 20 ft. diameter to provide room for piston ring grooves and nylon or graphite packing.

In this assembly, the piston reciprocates horizontally back and forth for a distance of 40 feet propelled by combustion products entering the steel pipe at top of one end of the tube, and then the other end. The steel pipe is supported outside of the ends of tube by roller bearings. The steel pipe projects into extra heavy, water-filled pipes at the ends. These pipes have check valves to prevent water from reversing its flow at the ends of the strokes.

The water is accumulated in a reservoir or tank under air pressure from which water continuously flows into hydro-electric generator with an efficiency of 80% to 90% compared to less than 50% for steam power plants and much lower capital and operating costs.

In this example, the 486 Psa steam exerts a pressure on piston of 3.1416×5×5=78.54 sq. ins.×486 lbs/sq in.=38,170 over the stroke length of 10 ft. for a total force of 381,700 ft lb.

Example 2

Exhausting combustion products from a steam fired power plant steam with a pressure of 5.47 psia.

Even though 14.7 psia is air pressure at sea level, a reinforced concrete cylinder made of light weight vermiculite concrete retains little heat in its walls or the float on water which drives the pelton wheel. The 5.47 psia pressure is multiplied by ratio between a 10 ft. diameter cylinder and a 4 in. diameter jet driving the Pelton wheel is $$\frac{3.1416 \times 25 \times 144 \text{ in}}{3.1416 \times 4 \text{ ins}}$$

or 5.47×900=4923 psia at a height above seal level of 32.4 ft/14.7 4923×32.4/14.7=4923×2.2=10,841 ft. elevation. Use of an 8 inch diameter jet would reduce the elevation from 8×8/4×4−1/4×10,841=2710 ft., a more common elevation for hydroelectric power.

In the 60,000 KW plant (pg 9–57 of MARK'S 8th Ed. HANDBOOK), 31,843 lbs steam are extracted per hour at 5.47 psia and 29,525 at 34.8 psia totaling 61,008 or about ½ as much as for high pressure steam where thermal efficiency is 38%. Overall hydropower efficiency can be thus increased to 80% or more. Applying the invention to this example by directing the water to a hydropower apparatus with 2710 head shows 0.333×80%=26.6 compared to 0.666×38%=25.4 in the steam plant. This increases plant efficiency to 52%.

I claim:

1. A process for generating hydro-electric power which comprises:

burning a fossil fuel to generate combustion products;

introducing the combustion products into a first tank which is full of water to displace the water and cause it to exit the tank; and directing the exiting water to a hydro-electric apparatus for operation of the hydro-electric apparatus same to generate power.

2. The process of claim 1 wherein the tank includes a movable plate therein and which further comprises displacing the water by introducing the combustion products to displace the plate.

3. The process of claim 1 which further comprises utilizing a second tank in the same manner as the first tank so that one tank can be refilled with water while the other is releasing water.

4. The process of claim 3, wherein one tank is smaller than the other tank and is placed inside of the other tank to reduce operating costs.

5. The process of claim 3 wherein each tank includes a movable plate therein for displacing the water therein.

6. The process of claim 3 which further comprises directing the water which exits the hydro-electric apparatus back to one of the tanks.

7. The process of claim 5 wherein the water is directed back to one of the tanks while the other is receiving combustion products and displacing water.

8. The process of claim 7 wherein the water is heated before being directed back to the tanks.

9. The process of claim 1 wherein the hydrocarbon fuel to be combusted is coal, oil or natural gas.

10. The process of claim 1 wherein the water includes alkaline material therein to offset acidic components from the combustion products and reduce corrosion of the hydro-electric apparatus.

11. The process of claim 1 wherein the water exits the tank through an aperture which has a relatively small area compared to the cross-sectional area of the tank.

12. The process of claim 1 which further comprises selecting the area of the tank to be between 20 and 50 times the area of the aperture.

13. The process of claim 1 which further comprises directing the exiting water to a reservoir prior to directing the water to the hydro-electric apparatus.

14. The process of claim 1 wherein the hydro-electric apparatus comprises a Pelton wheel which is rotated to generate electricity.

15. The process of claim 1 wherein the hydro-electric apparatus produces direct current for charging one or more batteries.

16. A process for generating hydro-electric power which comprises:

introducing a mixture comprising oxygen and a fossil fuel into a first tank which is substantially full of water;

combusting the mixture to form combustion products which displace the water and cause it to exit the tank; and directing the exiting water to a hydro-electric apparatus for operation of the hydro-electric apparatus to generate power.

17. The process of claim 16 wherein the fuel is in a gaseous state, the oxygen is supplied by air and which further comprises utilizing copper or brass screens to prevent burning of the fuel and oxygen before the mixture enters the tank.

18. The process of claim 16 which further comprises heating the fuel, oxygen or fuel/oxygen mixture before it enters the tank to facilitate combustion.

19. The process of claim 16 wherein the water in the tank is heated by the combusted mixture to reduce its viscosity and increase the efficiency of operation of the hydro-electric apparatus.

20. The process of claim 16 wherein the tank is insulated to retain heat therein for warming one or more of the fuel, oxygen, fuel/oxygen mixture or water therein.

* * * * *

UNITED STATES PATENT AND TRADEMARK OFFICE
CERTIFICATE OF CORRECTION

PATENT NO.    :    5,713,202

DATED         :    February 3, 1998

INVENTOR      :    Arthur F. Johnson

It is certified that error appears in the above-identified patent and that said Letters Patent is hereby corrected as shown below:

Column 6, line 27: after "hydro-electric apparatus" delete "same".

Signed and Sealed this

Fourteenth Day of April, 1998

Attest:

BRUCE LEHMAN

*Attesting Officer*    *Commissioner of Patents and Trademarks*